United States Patent [19]

Kinzler

[11] 4,237,662
[45] Dec. 9, 1980

[54] STRUCTURAL MEMBERS, METHOD AND APPARATUS

[75] Inventor: Jack A. Kinzler, Seabrook, Tex.

[73] Assignee: The United States of America as represented by the Administrator of the National Aeronautics & Space Administration, Washington, D.C.

[21] Appl. No.: 893,383

[22] Filed: Apr. 4, 1978

[51] Int. Cl.³ ............................................. E04N 12/18
[52] U.S. Cl. .......................................... 52/108; 52/745
[58] Field of Search .......................... 52/108, 741, 745; 242/54 A

[56] References Cited

U.S. PATENT DOCUMENTS

| | | | |
|---|---|---|---|
| 2,799,368 | 7/1957 | Alter | 52/108 |
| 3,564,789 | 2/1971 | Vyvyan et al. | 52/108 |
| 3,670,773 | 6/1972 | Guerster | 52/108 X |
| 3,889,632 | 6/1975 | Rew | 242/99 X |
| 3,925,875 | 12/1975 | Doke | 52/666 X |

*Primary Examiner*—Carl D. Friedman
*Attorney, Agent, or Firm*—Edward K. Fein; John R. Manning; Marvin F. Matthews

[57] ABSTRACT

Disclosed are a structural member, such as a truss, and a method and apparatus for fabricating the same from flexible sheet material in compacted form. A plurality of generally tubular columns are progressively formed from the sheet material and deployed generally parallel to one another. Adjacent pairs of the columns are interconnected by respective side members, each of which is comprised of a strip of the sheet material. The sheet material is fastened together by self-attaching fasteners integrally formed from the sheet material of the columns and side members themselves.

60 Claims, 21 Drawing Figures

FIG. 2
FIG. 3
FIG. 3A
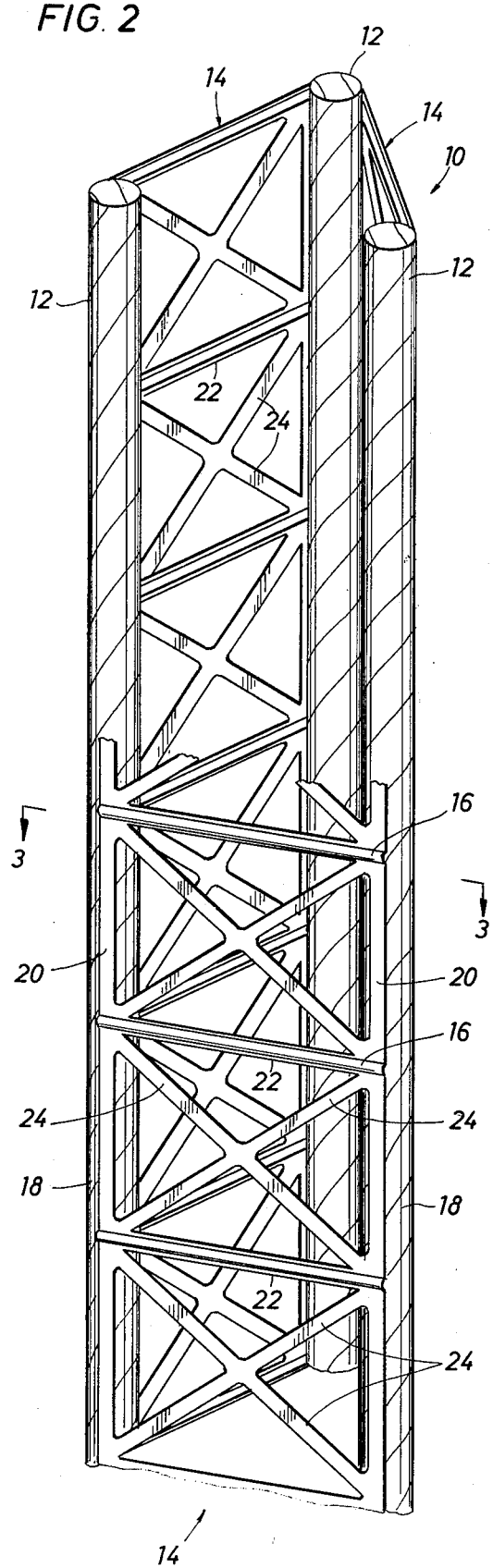
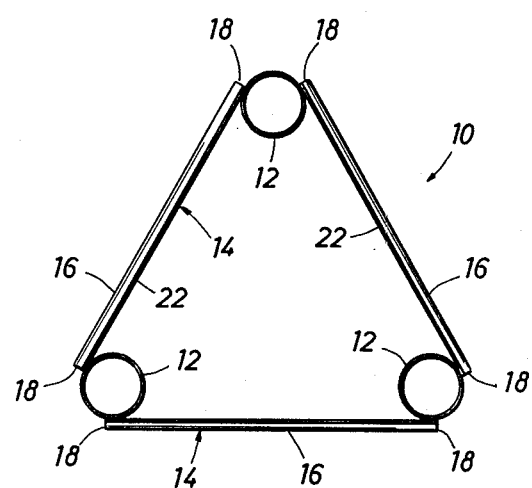
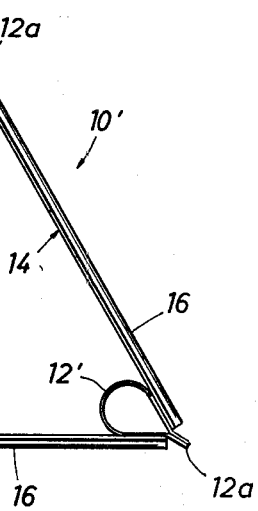

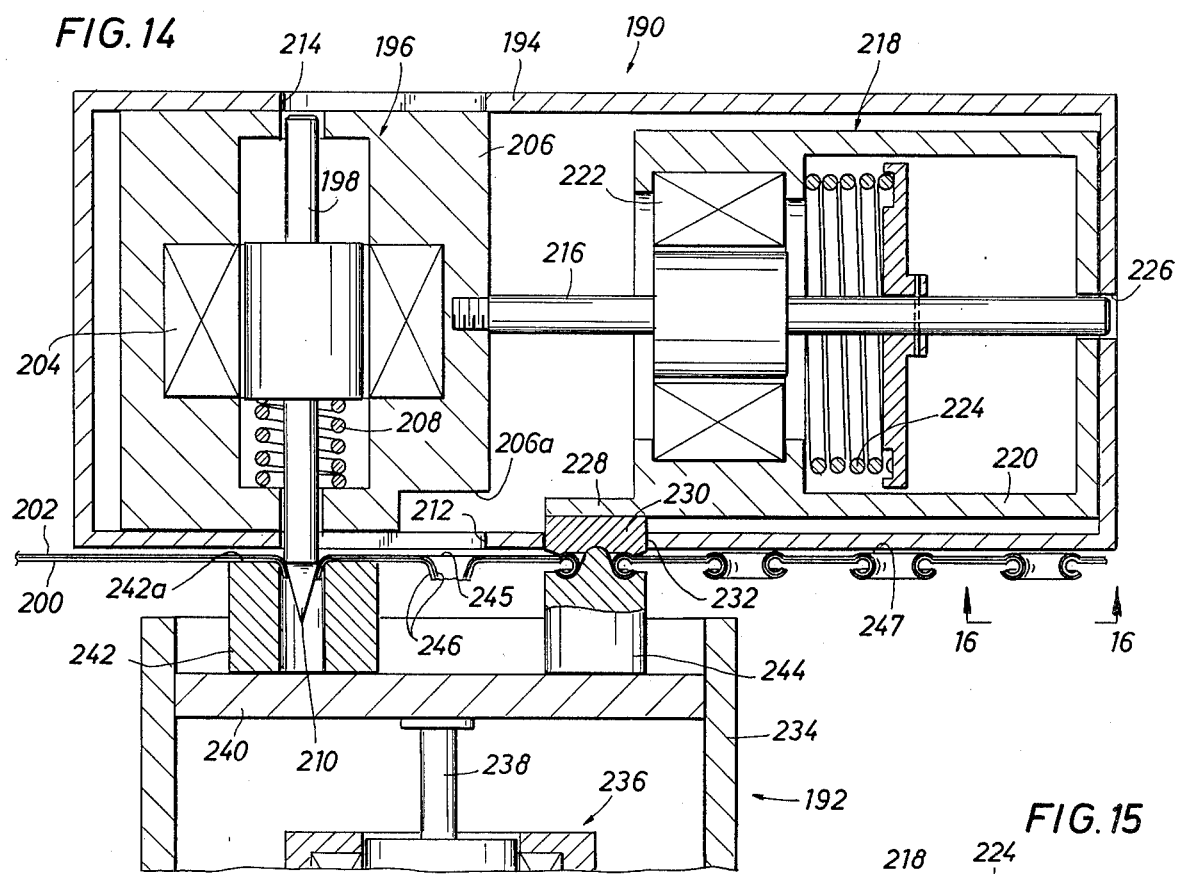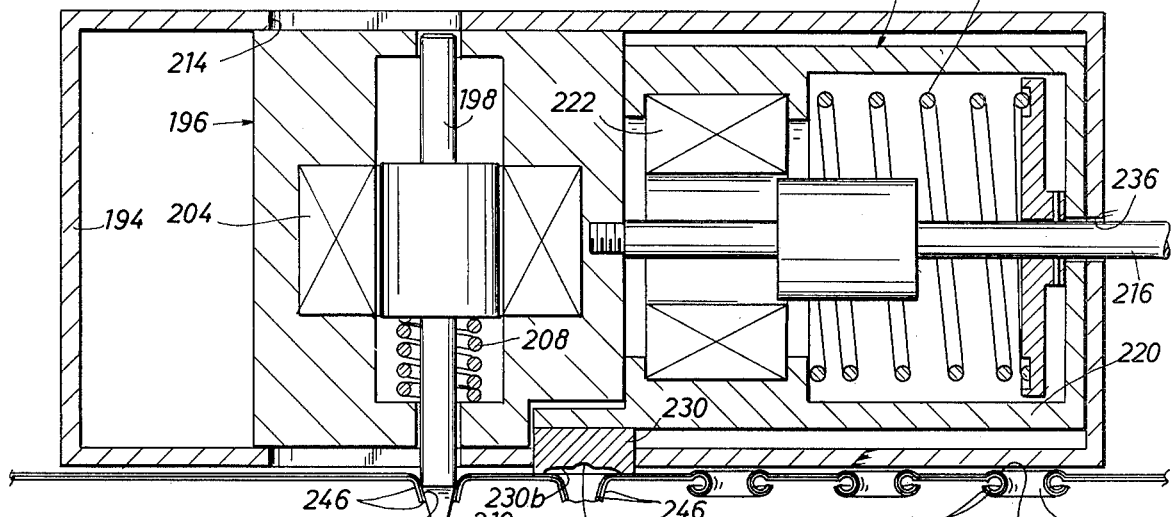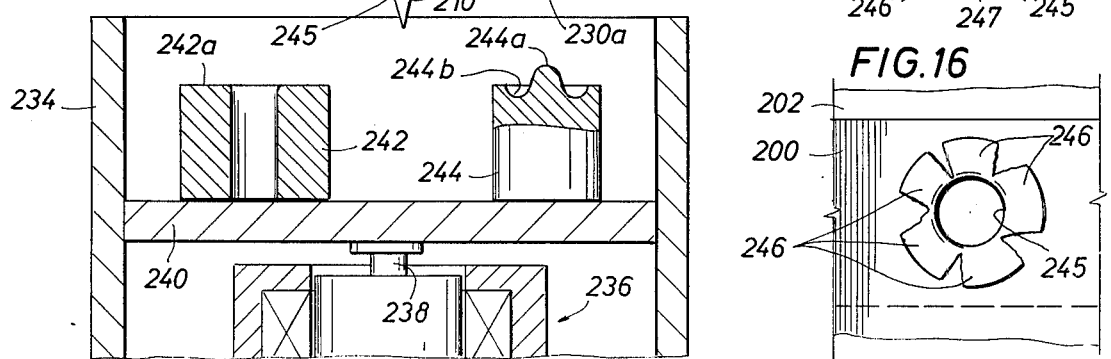

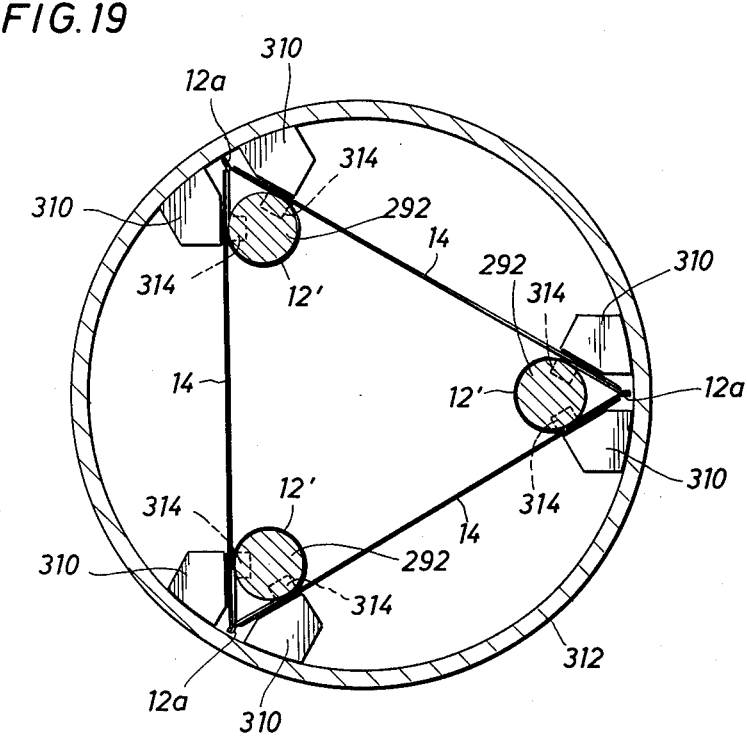
FIG. 19
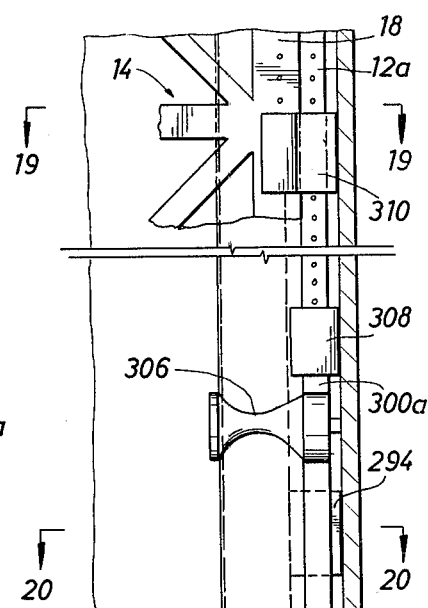
FIG. 18
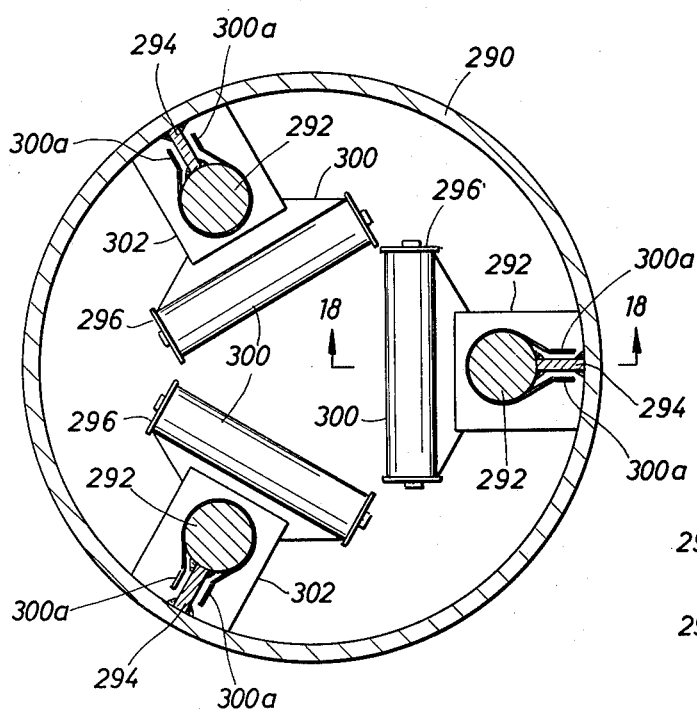
FIG. 20
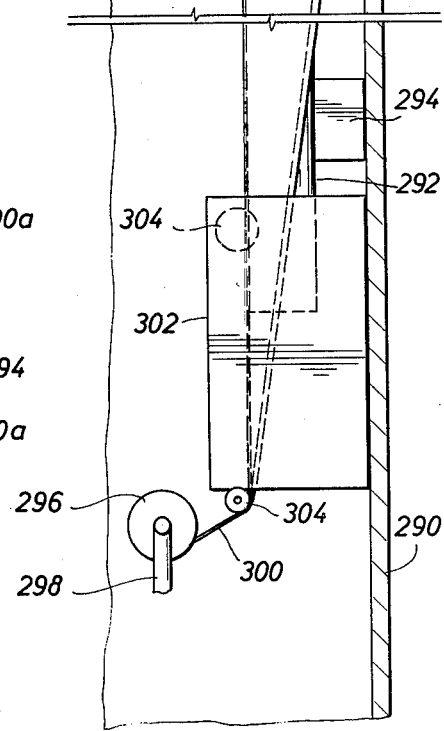

STRUCTURAL MEMBERS, METHOD AND APPARATUS

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

1. Field of the Invention

The present invention relates to the fabrication of structural members such as trusses, particularly for use in space. The usefulness of large orbiting space structures such as solar energy collecting stations and various other types of space stations is now widely recognized. In constructing such structures, it is impracticable to transport the building materials to the space construction site in the form of completed structural units such as trusses. Only relatively few such units could be transported in a single trip of the space shuttle or other vehicle. Thus the cost of transporting enough units to construct a large space structure would be prohibitive.

It is thus extremely important that techniques be developed for forming the structural units in space and that the construction materials be transported into space in the most compact form possible. At the same time it is necessary that these materials be as lightweight as possible and that the amount of material needed to construct a given item be minimized.

It thus becomes readily apparent that conventional construction materials, such as dense, rigid metal beams, plates, and the like are not practical for use in such projects. However, the environment of space with its low gravitational forces and relative freedom from airborne chemicals of various kinds permits the use of unique construction materials which would be unsuitable for like use on earth.

The use of such different materials, along with the differences in the space environment, in turn make the construction techniques conventionally used on earth impractical for use in space, and drastically different methods are indicated. Among the requirements of such different methods are that the fabrication process be as fully automated as possible and that the amount of additional material needed to fasten various component elements together be minimized.

2. Description of the Prior Art

U.S. Pat. Nos. 3,961,738 and 3,840,960 each disclose somewhat automated devices for manufacturing structural units. However, neither the raw materials, the manufacturing devices, nor the finished products as well suited for use in space. The raw materials include metal of substantial density and inherent rigidity, and the manufacturing methods and devices are adapted to these materials rather than to the types which are preferably used to form structural members for use in space. The finished products are likewise heavier than is proper for space structures. The techniques disclosed also involve numerous other features which would be undesirable for space use. For example, the device of U.S. Pat. No. 3,961,738 requires a separate connecting medium, namely a welding material, which constitutes additional weight and takes up additional space.

U.S. Pat. Nos. 3,740,812, 3,768,130, and 2,141,642 also disclose techniques for forming structural units which make some attempt to minimize the number of separate parts which must be attached together. However, again each of the prior patents is unsuitable for space use because of the rigidity and/or weight of the initial materials and/or the need for separate connecting elements or media.

U.S. Pat. Nos. 2,316,349 and 3,940,962 suggest means for forming cylindrical members from sheet material. The latter of these two patents also suggests means for fastening metal without additional connecting means, as do U.S. Pat. Nos. 3,722,280 and 3,470,596. However, none of these prior patents disclose apparatus which is well suited for use in space, nor are they suggestive of a total scheme for forming a structural member such as a truss.

SUMMARY OF THE INVENTION

The present invention comprises an apparatus and method of forming a structural member such as a truss, as well as the structural member itself. The method and apparatus of the invention are particularly suited for use in space in that they use as the basic construction material lightweight flexible sheet material in compacted form. Such material optimizes both the space and weight factors thereby permitting enough material for a substantial amount of construction to be carried on one trip of the transport vehicle.

Once the vehicle has reached the construction site, one or more structural members may be formed by a fully automated apparatus which minimizes the need for extra-vehicular activities by personnel. In particular, the truss-forming apparatus may remain in a suitable bay in the transport vehicle and the truss may be progressively formed by such apparatus and deployed from the bay.

In the preferred forms of the invention, the flexible sheet material is stored on or in the forming apparatus in compacted form, e.g. roll form. Column-forming means progressively form a plurality of tubular column members from respective strips of the sheet material and deploy these column members generally parallel to one another. Adjacent pairs of the column members are interconnected by progressively securing a respective side member, comprised of a respective strip of the sheet material, between each such pair of column members.

The sheet material from which the structural member is made is much more flexible and less dense than the materials used in constructing structural members for use on earth. However, the manner in which such sheet material is formed into the structural member permits the latter to withstand extremely high loading, particularly in comparison with its own weight. For example, while the sheet material per se is inherently flexible, in the ordinary sense of the word, the structural member formed therefrom is substantially rigid, i.e. capable of maintaining its form under significant loads. In the uses for which such structural members are primarily intended, the main type of loading encountered will be endwise compressive loading. The tubular form of the column members enables them to withstand endwise compressive loads far exceeding their own weights.

The weight of the sheet material from which the structural members are fabricated may be further reduced by pre-cutting the strips of sheet material from which the side members are to be made to form interconnected strips to serve as compression and tension struts. Such struts provide ample structural strength for the structural member, yet the removal of the excess material therebetween substantially reduces the weight of the construction material needed for each member. The resulting open areas also enhance the thermal expansion characteristics of the finished truss by permitting exposure of all sides to the sun's rays. The compressive strength of each of the compression struts may be further enhanced by forming an elongate bead thereon.

The present invention further reduces the weight of the raw material which must be carried to the construction site in space by providing for the securing together of overlapping layers of the sheet material by self-attaching tabs formed from the main bodies of the sheet material itself. Thus no separate connecting members or media, such as welding material, staples, adhesive, or the like, need be carried by the transport vehicle nor are any wasteful by-products produced. These self-attaching tabs may be used not only to fasten the side members to the column members of the structural member, but also to fasten the sheet material of each individual column member upon itself. In the preferred forms of the invention, the apparatus for forming such tabs also serves to advance the sheet material during the progressive formation of the structural member.

Several special techniques may be employed to see that the structural member is kept straight as it is progressively formed. This is especially important as it is anticipated that the individual structural members will be much longer than their earth-borne counterparts. One of these techniques is to deploy the structural member toward the earth. While the environment of the construction site may be considered "weightless" for most purposes, the slight amount of the earth's gravity which is exerted, in the absence of other substantial gravitational forces, can have a significant effect on the path in which the structural member is progressively deployed and thus on its straightness.

Another technique which may be used in this connection is the sensing of a target mounted on the end of the structural member and movable therewith. By comparing this target with a suitable reference, it is possible to detect slight deviations before they advance to a harmful degree. One way of providing for such compensation is to provide separate variable speed motors for the forming mechanisms for the respective column members and selectively varying their speeds to control the direction of deployment of the structural member.

Accordingly, it is a principal object of the present invention to provide a structural member comprised of flexible sheet material and a method and apparatus for forming same.

Another object of the invention is to provide an automated apparatus for forming such a structural member.

A further object of the invention is to provide a structural member, method, and apparatus therefor which are particularly suited for use in space.

Still another object of the invention is to provide a means for attaching overlapping layers of sheet material without the use of separate connecting media.

Another object of the invention is to provide means for guiding the direction of progressive formation of a structural member.

Still other objects, features, and advantages of the present invention will be made apparent by the following description of the preferred embodiments, the drawings, and the claims.

BRIEF DESCRIPTION OF THE DRAWING

FIG. 2 is a perspective view of a structural member according to the invention with parts broken away.

FIG. 3 is a transverse cross-sectional view taken on line 3—3 of FIG. 2.

FIG. 3A is a view similar to that of FIG. 3 of a second form of the structural member.

FIG. 14 is an enlarged sectional view of a second type of fastening assembly.

FIG. 15 is a view similar to that of FIG. 14 showing the movable parts in a different position.

FIG. 16 is a plan view of one of the self-fastening means formed by the assembly of FIGS. 14 and 15.

FIG. 18 is a longitudinal view partly in section of a column-forming assembly for forming the type of column shown in FIG. 3A taken on line 18—18 of FIG. 20.

FIG. 19 is a transverse sectional view taken on line 19—19 of FIG. 18.

FIG. 20 is a transverse sectional view taken on line 20—20 of FIG. 18.

DESCRIPTION OF THE PREFERRED EMBODIMENTS

Figure 1:
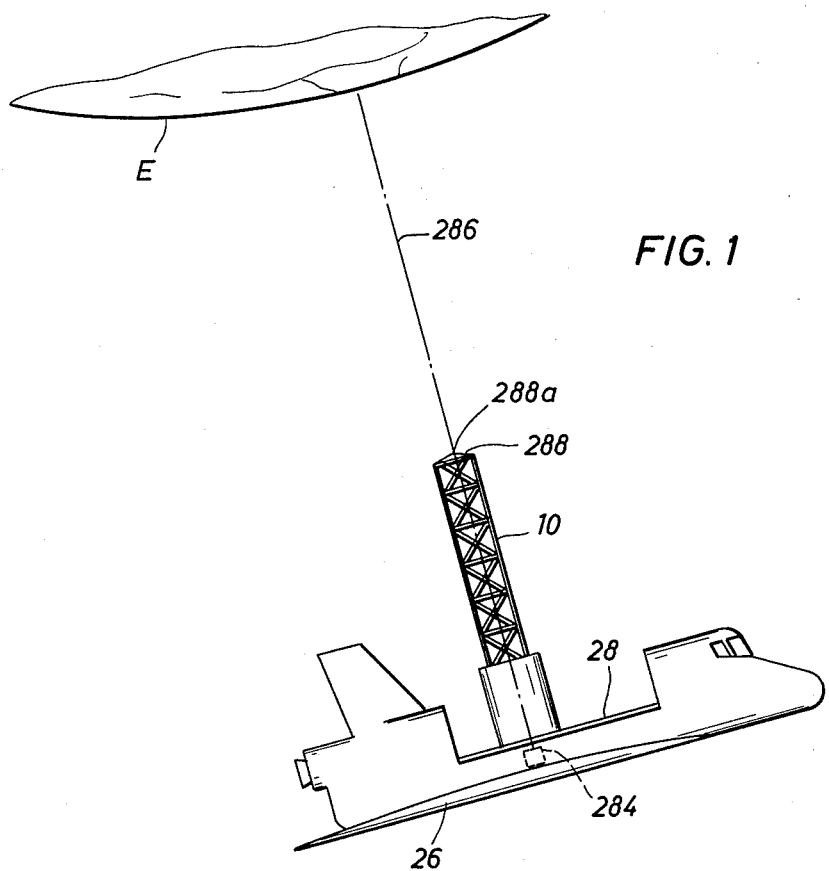
FIG. 1 is an elevational diagrammatic view of a structural member being deployed from a space vehicle in accord with the invention.

Referring now to the drawing, FIGS. 2 and 3 illustrate a structural member, in particular a truss 10, according to the present invention. The truss 10 is formed of sheet material which is, per se flexible. However, the sheet material is formed into a truss in such a way that the finished product is essentially rigid. While flexibility and rigidity are technically relative qualities, the terms "flexible" and "rigid" will be used herein in a common or every day sense. Thus where a substantial length of a sheet material, say one or two meters, will flex under its own weight, e.g. when one end thereof is lifted, or can be easily flexed manually, at earth's gravity, the sheet material will be considered "flexible." On the other hand, the finished truss of the length desired for use in a space construction project, is capable of substantially maintaining its configuration without readily noticeable deformation under at least its own weight, whether loaded endwise as a column or laterally as a beam, and would be considered "rigid."

One example of a preferred type of sheet material for the formation of the trusses of the present invention is sheet aluminum. Aluminum rolled stock ranging in gauge from about 0.01 cm. (0.004 in.) to 0.03 cm. (0.012 in.) has been successfully tested for use in the present invention. Other examples of suitable sheet materials are thermoplastic materials such as polysulfones as well as plastic laminates, either "pre-preg" or finished. Each of these materials has a number of characteristics which are desirable in connection with the present invention. In particular, they are essentially flexible, yet not too flexible to prevent their formation into an essentially rigid finished product. Their flexibility permits them to be stored in compacted form, e.g. on rolls, in the transport vehicle. The preferred materials are also of relatively low density, as compared to conventional construction materials such as steel. Thus sufficient material for a substantial amount of construction may be transported to the space construction site by a vehicle such as the space shuttle. The flexibility of the material also permits its formation into a truss with light duty equipment.

Referring again to FIGS. 2 and 3, the truss 10 includes three parallel tubular columns 12. As used herein, the term "tubular" will be used to denote a structure which is essentially continuous and closed (with the exception of relatively small openings or the like such as might be formed, for example, by the attachment means to be described below), and such terminology is not intended to limit the configuration of the column to a cylindrical form. Each of the columns 12 is formed from a respective strip of sheet material closed upon itself by helical winding and then fastened in a manner to be described more fully below.

Each adjacent pair of the columns 12 is interconnected by a respective side member 14 formed by a respective strip of sheet material. Each side member 14 is substantially planar, with the exception of beads 16, and is disposed with its opposite side edges 18 adjacent respective ones of the connected pair of columns 12. Thus the truss 10 is generally triangular in transverse cross-sectional configuration, as best shown in FIG. 3.

In order to further reduce the weight of the construction material and the finished truss, the side members 14 are precut to remove excess material over and above what is necessary to provide sufficient structural strength in the finished truss. Each side member thus includes a pair of longitudinally extending attachment elements 20 each adjacent a respective one of the side edges 18 and secured to the adjacent column 12. The pre-cutting also forms a number of strut elements extending generally transversely between the attachment elements and integral therewith. These strut elements include longitudinally spaced apart compression struts 22 disposed substantially perpendicular to the attachment elements 20. The sheet material of the side members 14 is deformed to provide an elongate bead 16 along each of the compression struts and through the adjacent portions of the attachment elements 20, i.e. from one side edge 18 to the other. Beads 16 increase the compressive strength of the struts 22. The strut elements also include a number of tension struts 24 extending diagonally between the attachment elements 20 and the compression struts 22 and integral therewith. In the form of truss shown, there are a pair of crossed tension struts 24 between each adjacent pair of the compression struts 22. However numerous other arrangements are possible.

The pre-cutting of the side members and the resulting open areas between the struts and attachment elements also enhances the thermal expansion characteristics of the finished truss by permitting at least some direct exposure of each column and side member to solar radiation. This substantially reduces the problem of bending of the truss which might otherwise occur due to disproportionate thermal expansion of opposite sides of the truss, where one side is directly exposed to the sun's rays, and the other side is substantially shielded.

Figure 4:
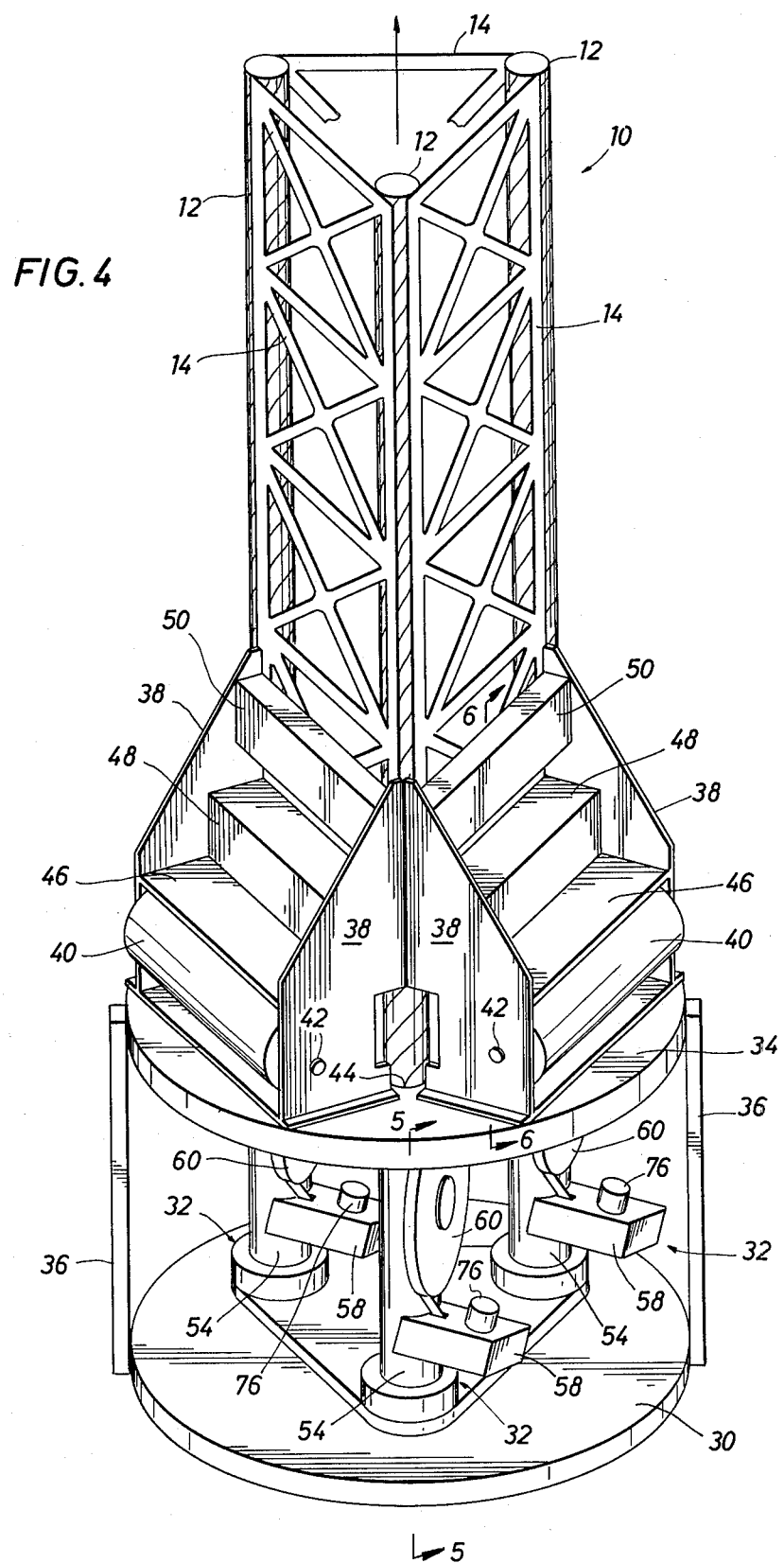
FIG. 4 is a perspective view of the apparatus for forming the structural member of FIGS. 2 and 3.

Referring now to FIG. 4, there is shown an apparatus for progressively forming the type of truss 10 illustrated in FIGS. 2 and 3. The apparatus is sized to fit in a bay in a suitable transport vehicle, such as the space shuttle 26 illustrated in FIG. 1. During transport, the apparatus may be disposed in a sideways position in the cargo bay. When the construction site is reached, the doors 28 of the bay may be opened and the apparatus may be raised to an upright position with respect to the shuttle 26 on suitable hinged connections. As the truss 10 is progressively formed, it is deployed outwardly from the shuttle 26.

The truss-forming apparatus of FIG. 4 includes a base plate 30 on which are mounted three column-forming assemblies 32 each for forming a respective one of the columns 12. A second plate 34 is supported above the assemblies 32 by a number of spacers, two of which are shown at 36, interconnecting the plates 30 and 34. The columns 12 progressively formed by the assemblies 32 are deployed upwardly through apertures 44 in plate 34 for connection to the side members 14.

Mounted on plate 34 are four pair of brackets 38. At the bottom of each pair of brackets 38 a roll 40 of sheet material for a respective one of the side members 14 is stored between the brackets 38 and mounted on a respective spindle 42 whose ends are rotatably mounted in respective ones of the pair of brackets 38. The brackets 38 of each pair are aligned with respective ones of a pair of adjacent columns 12 whereby the respective roll 40 is properly positioned generally parallel to its intended final position interconnecting those two columns.

A shelf 46 is rigidly mounted between each pair of brackets 38 above the respective roll 40. Mounted on each shelf 46, and also between the respective pair of brackets 38, is a bead-forming assembly 48. Each of the assemblies 48 sequentially forms beads 16 on the sheet material for a respective one of the side members 14 after it is deployed from the roll 40 but prior to its attachment to the columns 12.

A respective housing 50 is mounted above each of the bead-forming assemblies 48 on and between the respective pair of brackets 38. Each of the housings 50 encloses at one end a portion of an attaching assembly for progressively securing one of the attachment elements 20 of the respective side member 14 to the adjacent one of the columns 12. The other attachment element 20 of that side member 14 is similarly secured to its respective column 12 by an identical assembly portion housed in the other end of housing 50.

Figure 5:
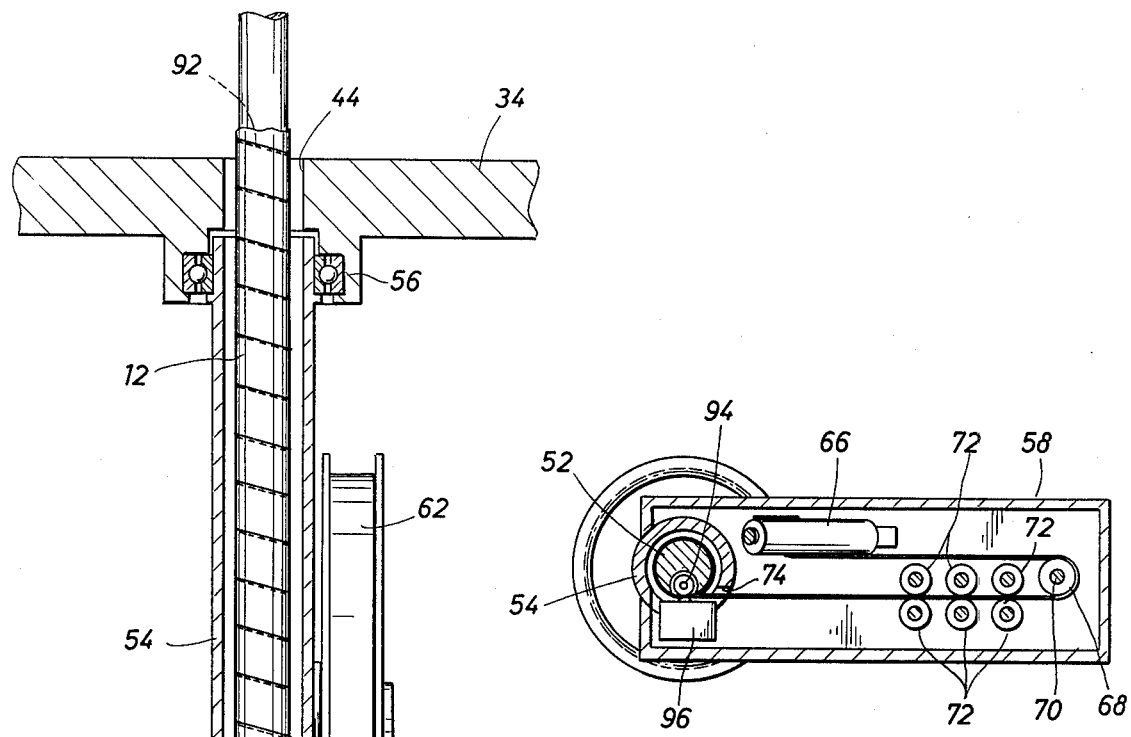
FIG. 5 is a longitudinal cross-sectional view of one of the column-forming assemblies of the apparatus of FIG. 4.
Figure 6:
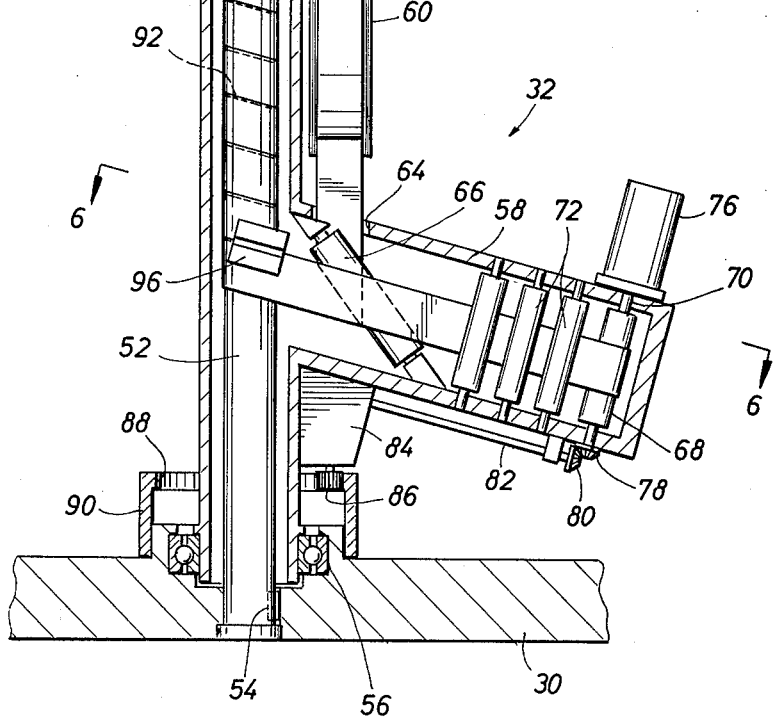
FIG. 6 is a cross-sectional view taken on line 6—6 of FIG. 5.

Referring now to FIGS. 5 and 6 in conjunction with FIG. 4, one of the column-forming assemblies 32, each of which is identical, will be described in more detail. The assembly 32 includes the lower portion of a mandrel 52 rigidly mounted in the base plate 30 to extend perpendicularly therefrom by any suitable means such as a key 54. Mandrel 52 extends through the aperture 44 in upper plate 34 to support the column 12 for securing to the side members 14. A sleeve 54 coaxially surrounds the portion of mandrel 52 between plates 30 and 34. The ends of sleeve 54 are rotatably mounted in respective ones of the plates 30 and 34 by bearing assemblies 56. Extending laterally outwardly from sleeve 54 and integral therewith is a roller housing 58. Housing 58 is not perpendicular to sleeve 54 but rather is angled toward plate 30 from its inner to its outer extremity for a purpose to be described below. A reel 60 is mounted on the exterior of sleeve 54 above roller housing 58 for rotation about an axis perpendicular to that of sleeve 54. Reel 60 stores a roll 62 of sheet material for forming the respective column 12.

The strip of sheet material is threaded from the roll 60 through an aperture 64 in the roller housing 58 and under a first idler roller 66. Roller 66 is rotatably mounted in the housing 58 with its axis at an angle to the sleeve 54, as well as to the direction at which housing 58 extends from the sleeve, such that it changes the orientation of the strip of sheet material from parallel to sleeve 54 to parallel to housing 58. The strip of sheet material next passes away from sleeve 54 and around a drive roller 68 rotatably mounted in the distal end of housing 58 on a shaft 70. Shaft 70 and roller 68 are disposed perpendicular to the direction in which housing 58 extends from sleeve 54. The strip of sheet material next passes back toward sleeve 54 between pairs of opposed idler rollers 72 rotatably mounted in housing 58 parallel to drive roller 68. The strip then passes through an aperture 74 in sleeve 54 and onto the mandrel 52.

An electric variable speed motor 76 is mounted on the exterior of housing 58 and operatively associated with the shaft 70 of the drive roller 68. Shaft 70 extends through housing 58 and has a bevel gear 78 on its end opposite motor 76 and just outside housing 58. Gear 78 engages another gear 80 on the end of a shaft 82 which extends along the exterior of the housing 58 and into a gear box 84 mounted on sleeve 54 below housing 58. Through gears (not shown) in the box 84 torque is transmitted to a spur gear 86 engaging the teeth of a second spur gear 88 formed on the interior of an annular flange 90 rigidly mounted on plate 30 in coaxially surrounding relation to the lower portion of sleeve 54.

It can thus be seen that when the motor 76 is operating, the entire sub-assembly comprising the sleeve 54 and housing 58 along with the various parts mounted thereon is caused to rotate about the mandrel 52 thus wrapping the strip of sheet material around the mandrel 52. Due to the angle at which housing 58 extends from sleeve 54, the strip is helically wrapped with adjacent turns of the helix overlapping along the side edges of the strip of sheet material as indicated in phantom at 92.

The turns of the helix of column 12 are first brought into overlapping relation at the point at which the sheet material first engages the column. Adjacent this point there is a fastening assembly, one sub-assembly 94 of which is mounted within the mandrel 52, and the other sub-assembly 96 of which is mounted on the sleeve 54 adjacent aperture 74 for rotation with sleeve 54. The assembly 94, 96 will be described in detail below. At this point it is simply noted that assembly 94, 96 serves to secure together the overlapping layers of sheet material of column 12 by self-attaching tab means formed from the sheet material itself.

The column 12 thus formed, while comprised of sheet material which per se is flexible, has sufficient rigidity as a column so that, as the sheet material continues to be progressively wrapped around the mandrel 52 and attached upon itself, the column thereabove is forced along the mandrel 52 and deployed toward the fastening assemblies for securing the side members 14 to the column. While roller 68 has been shown as a drive roller, this expedient is not strictly necessary as the wrapping and attaching of the sheet material will in many cases be sufficient to advance the column 12 along the mandrel and to pull additional sheet material from roll 62. However, the provision of a drive connection to roller 68 ensures proper movement of the sheet material. It is also noted that, because the sub-assembly including sleeve 54, housing 58, etc. rotates about mandrel 52, rather than the mandrel 52 rotating within sleeve 54, the column 12 does not rotate as it is deployed along the mandrel 12 thereby facilitating simultaneous attachment of the three columns 12 to the side members 14.

Figure 7:
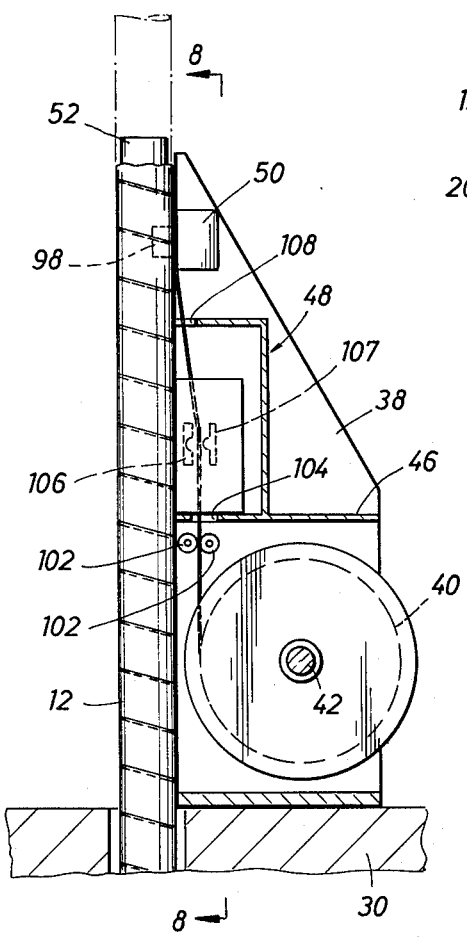
FIG. 7 is a sectional view taken on line 7—7 of FIG. 4 and including one of the bead-forming assemblies and one of the fastening assemblies for the side members.
Figure 8:
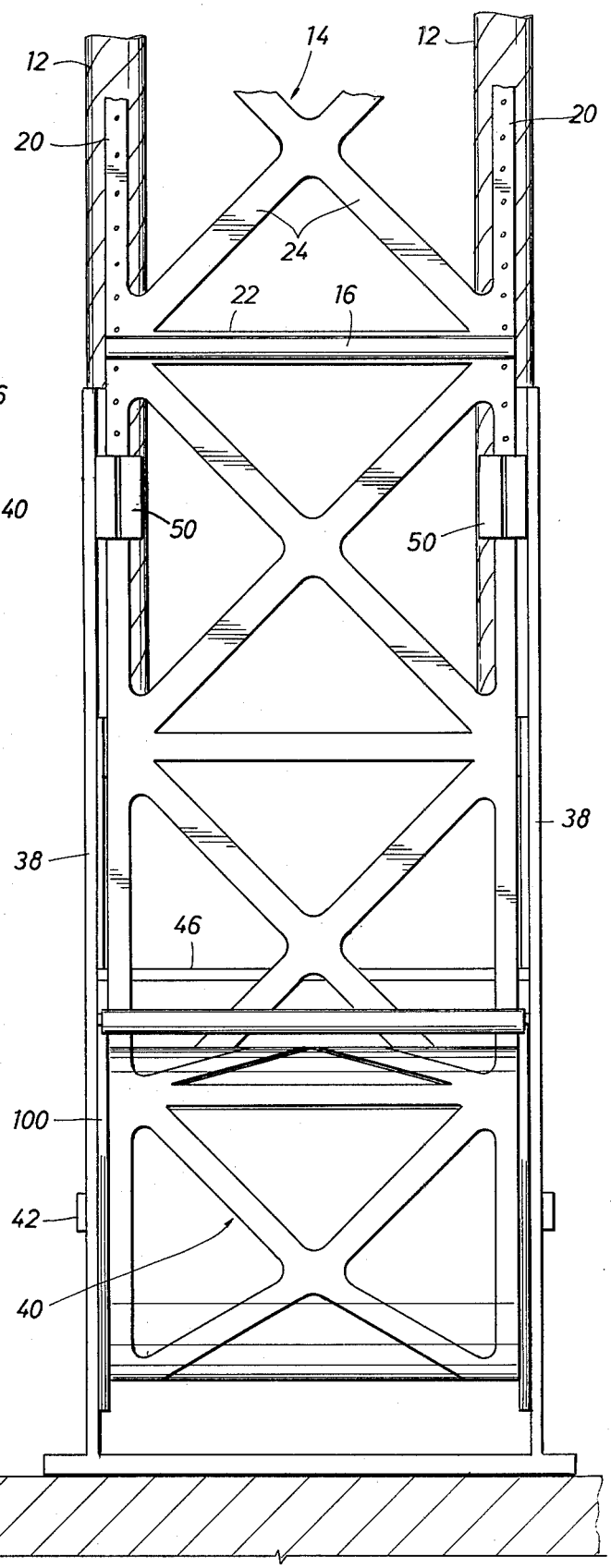
FIG. 8 is a view taken on line 8—8 of FIG. 7.

Referring now to FIGS. 7 and 8, there is shown the apparatus disposed between one pair of brackets 38. This apparatus includes a roll 40 of sheet material for a respective one of the side members 14 of the truss, a bead forming assembly 48, and a pair of fastening assemblies each of which comprises sub-assemblies 50 and 98. As best seen in FIG. 8, the sheet material for the side member 14 is pre-cut to remove the material between the strips which are to serve as the attachment elements 20 and struts 22 and 24. The material is then wound on a spool 100 which rotates on a shaft 42 whose ends are mounted in respective ones of the brackets 38. Thus the sheet material is stored on the apparatus for transport to the construction site and subsequent use in forming the truss.

The sheet material is fed from the spool 100 upwardly between a pair of opposed guide rollers 102, through an aperture 104 in plate 46 and into the bead forming assembly 48. Within the assembly 48 a pair of "flying" dies, 106, 107 are cyclically driven, in a manner to be described more fully below, to successively form beads 16 on the compression struts 22 as the sheet material progressively passes through the assembly 48.

After passing through the assembly 48, the sheet material passes upwardly through an aperture 108 in the upper end of the housing of the bead-forming assembly and into the fastening assemblies 50, 98. Each of the fastening assemblies has one of its sub-assemblies 50 mounted on one of the brackets 38 and the other sub-assembly 98 mounted within a respective one of the mandrels 52 in opposition to the respective sub-assembly 50. The sub-assemblies 50 and 98 are thus positioned to fasten a respective one of the attachment elements 20 of the side member 14 to a respective one of the columns 12 in generally tangential relation. Like the fastening assemblies 94, 96 of the column-forming assemblies, fastening assemblies 50,98 operate to form self-attaching tabs from the overlapping layers of sheet material of the respective columns 12 and attachment elements 20 per se, without the use of extraneous fastening means, and further operate to advance the side member 14 and connected columns 12.

Apparatus similar to that shown in FIGS. 7 and 8 is disposed between each of the other two pair of brackets 38 for handling the other two side members 14.

Figure 12:
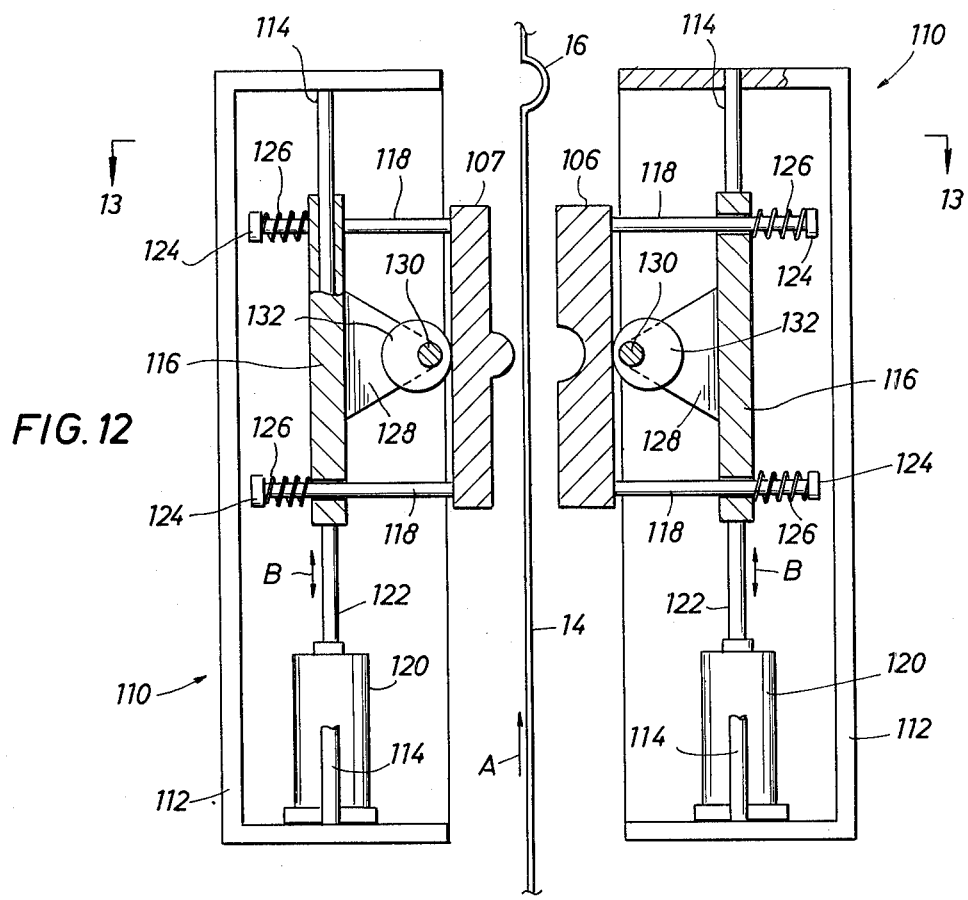
FIG. 12 is an enlarged view partly in section and partly in elevation of one of the bead-forming assemblies.
Figure 13:
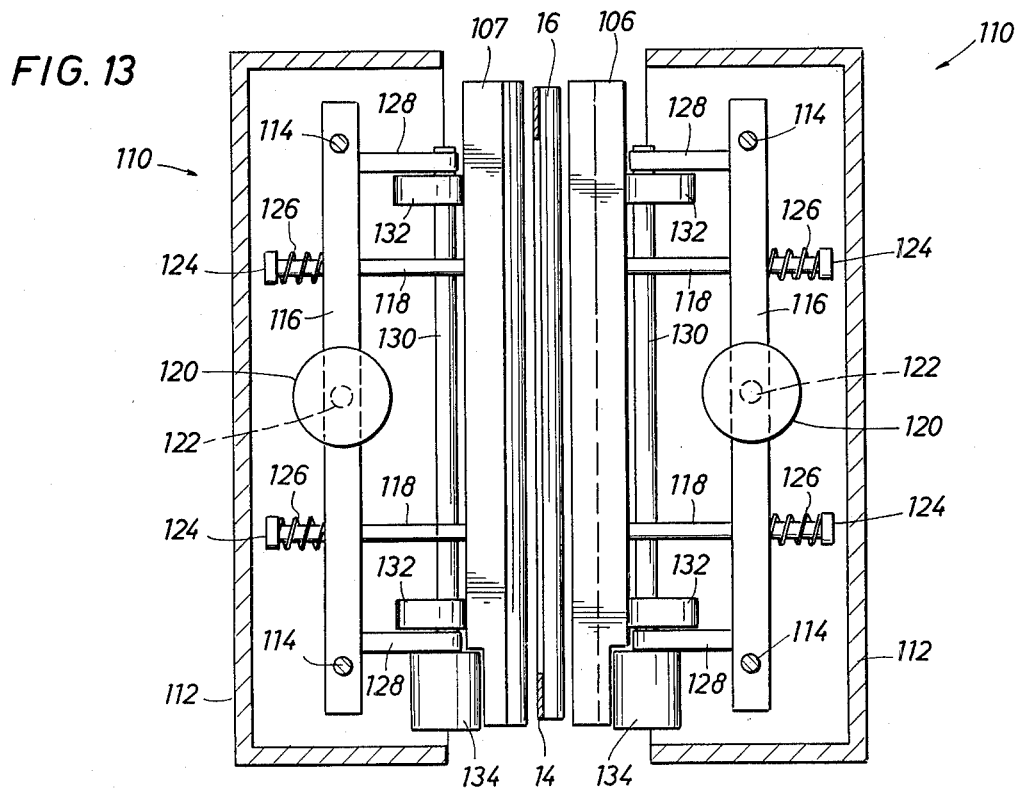
FIG. 13 is a view taken on line 13—13 of FIG. 12.

FIGS. 12 and 13 show one of the bead-forming assemblies in greater detail. This assembly includes two sub-assemblies 110, each associated with a respective one of the dies 106, 107. The sub-assemblies 110 are identical in structure and operation except for the fact that one sub-assembly includes female die 106, while the other includes a male die 107. Accordingly, all corresponding parts of the two sub-assemblies except for the dies will be given like reference numerals.

The sub-assembly 110 including the female die 106 further comprises a housing 112 having an open side facing toward the sheet material of side member 14. A pair of guide rods 114 are fixedly mounted in the housing 112 and disposed generally parallel to the direction in which the side member 14 moves through the bead-forming assembly, indicated by the arrow A. A mounting plate 116 is slidably mounted on rods 114 for reciprocating movement in the direction of arrow B, i.e. generally parallel to the direction of movement of side member 14. A motor 120 reciprocates plate 116 in the direction of arrow B via a rod 122 connected to the plate 116.

Four die-carrier rods 118 extend slidably through the plate 116 in a direction generally perpendicular to rods 114. The female die 106 is mounted on the ends of rods 118 at the open side of housing 112. Thus, as rods 118 slide in the plate 116, the die 106 is reciprocated toward and away from the sheet material in a direction generally transverse to the direction of movement of the sheet material. The ends of rods 118 distal the die 106 are provided with flanges 124. A compression spring 126 is mounted between each of the flanges 124 and the plate 116 whereby the rods 118 and attached die 106 are normally biased away from the side member 14.

A pair of brackets 128 extend from plate 116 toward die 106. Rotatably carried by the brackets 128 is a cam shaft 130. Shaft 130 is mutually perpendicular to both rods 118 and rods 114. Fixedly mounted on shaft 130 and spaced along its length are a pair of cams 132 which engage the die 106. A motor 134 is provided at one end of shaft 130 to rotate the shaft 130 and its cams 132.

It can be seen that, as the motor 120 reciprocates rod 122, the plate 116 will be reciprocated in the direction of arrows B, moving first in the same direction as side member 14 and then back in an opposite but parallel direction. Plate 116 will carry rods 118, die 106, brackets 128, cam shaft 130, cams 132 and motor 134 along with it in this reciprocating movement. Simultaneously, motor 134 will rotate shaft 130 whereby die 106 will be reciprocated toward and away from side member 14 alternately under the influence of the lobes of cams 132 and the springs 126. The motors 120 and 134 are synchronized so that the die 106 is cammed inwardly during the forward stroke of motor 120, i.e. that stroke which moves the plate 116 in the same direction as side member 14. During the return stroke of motor 120, in which plate 116 is moved in a direction opposite that of side member 14, die 106 is urged away from member 14 by springs 126. The speed of motor 120 is also synchronized with that of the fastening assemblies 50, 98. Thus the operation of the bead-forming assembly will not interfere with the movement of the side member 14.

As mentioned above, the left-hand sub-assembly 110 includes a like mechanism for simultaneously reciprocating male die 107 in the direction of arrows B and toward and away from side member 14. The mechanism for die 107 is synchronized with that for die 106 so that the dies are caused to mate as they move toward side member 14. Thus the dies deform the sheet material to successively form beads 16 spaced along the length of side member 14. The fact that both dies 106 and 107 move toward and away from the sheet material of side member 14, as well as along its direction of travel, further serves to prevent interference with the movement of side member 14, binding of the sheet material, etc. Furthermore, the sizes and speed of rotation of cams 132 are suitably coordinated with the spacing between the compression struts 22 of the side member so that the beads 16 will be formed on the compression struts.

Figure 9:
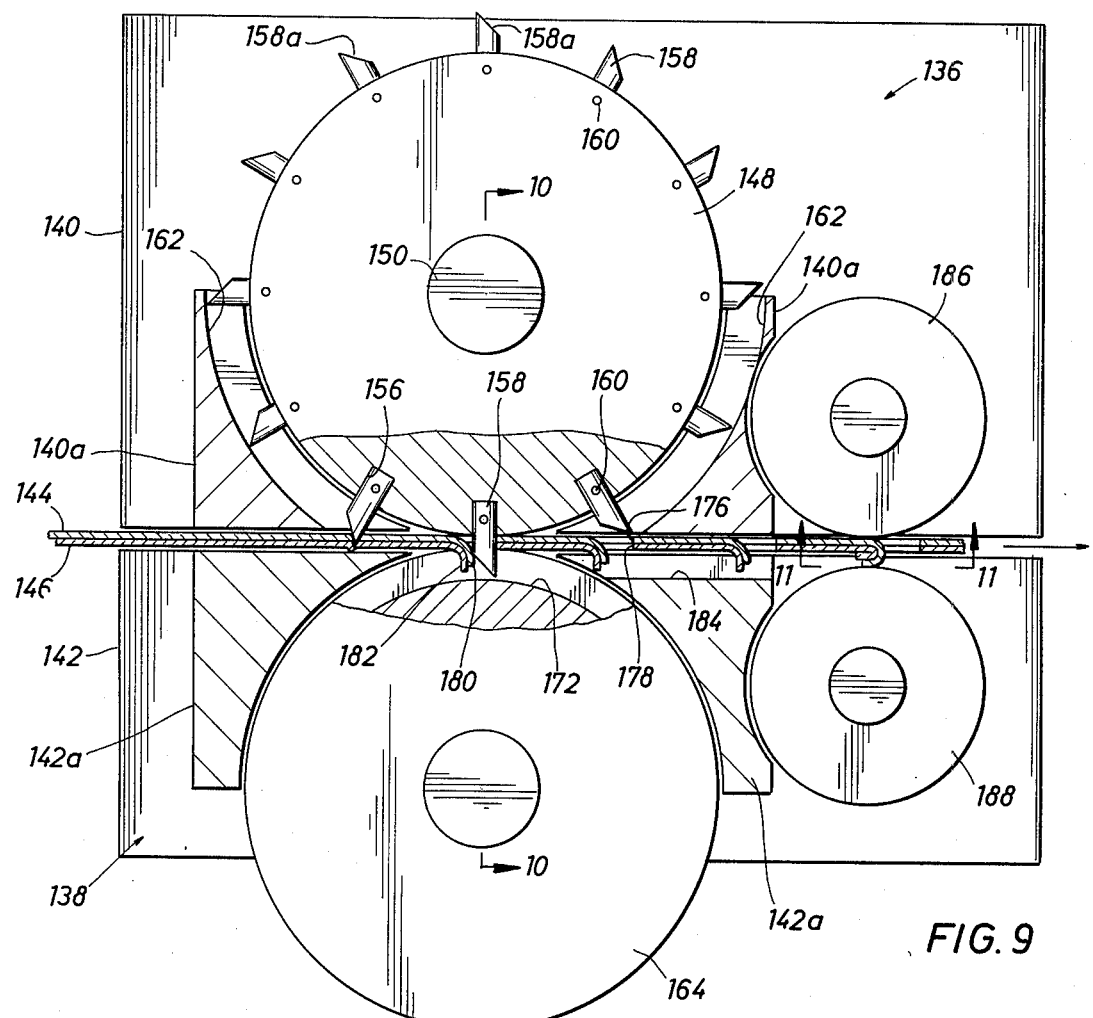
FIG. 9 is an enlarged view partly in section and partly in elevation of one form of fastening assembly.
Figure 10:
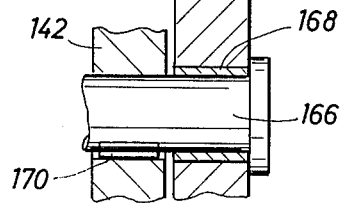
FIG. 10 is a view taken on line 10—10 of FIG. 9.
Figure 11:
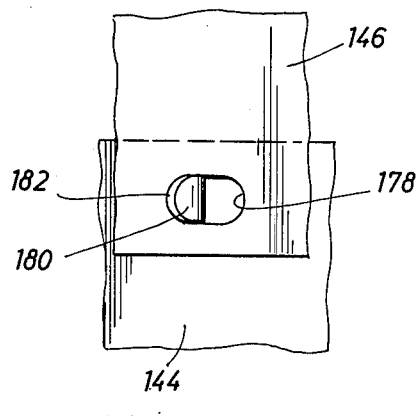
FIG. 11 is a plan view of one of the self-fastening means formed by the assembly of FIGS. 9 and 10.

Turning now to FIGS. 9 and 10, one form of fastening assembly is shown. The assembly of FIGS. 9 and 10 is a rotary type fastening assembly and includes two sub-assemblies 136 and 138. The rotary type fastening assembly is primarily intended to be used in the column-forming assemblies for the purpose of fastening the sheet material of each spiral column 12 upon itself, in which case one of the sub-assemblies 136 or 138 would be disposed in the mandrel 52 in the position diagrammatically indicated by 94, and the other sub-assembly would be disposed at 96 (see FIGS. 5 and 6). As will be explained more fully below, the assembly can also be used to join the sheet material for the type of column shown in FIG. 2A. However, with suitable structural modifications to prevent crushing of the beads 16, the basic principles of the rotary-type fastening assembly could be applied to the fastening of the side members to the columns.

The sub-assemblies 136 and 138 include respective framework members 140 and 142 respectively. Framework member 140 has thickened block portions 140a, and framework member 142 has opposing thickened block portions 142a. Portions 140a and 142a define a passageway therebetween, for overlapping layers of sheet material 144, 146 to be joined, and serve to support and guide the sheet material. Sub-assembly 136 has a driven disc 148 rotatably mounted thereon by a shaft 150 keyed to disc 148 by a key 152 and extending through framework 140 to a drive motor 154. Disc 148 has a plurality of sockets 156 extending radially thereinto. In each socket 156 a respective punch element 158 is secured by a pin 160. Block portions 140a are arcuately configured distal the sheet material 144, 146 to receive the disc 148 and are further provided with arcuate recesses 162 to permit passage of the punch elements 158.

Sub-assembly 138 has a second disc 164 journalled on a shaft 166 by a bushing 168. Shaft 166 is in turn keyed to framework member 142 by a key 170. Disc 164 is tangentially opposed to disc 148 and the circular path in which it is moved by motor 154. During such movement, the punch elements 158 are driven cyclically into and out of an annular recess 172 extending radially into disc 164. With the layers 144 and 146 of sheet material interposed between the discs 148 and 164, the circumferential edge surface 174 of disc 164 will serve as a backing surface for the sheet material, while the recess 172 will permit each punch element 158 to pass through the sheet material cutting a pair of aligned holes 176, 178 in the respective layers 144, 146 and forming a pair of overlapped tabs 180, 182 from the respective layers 144, 146 of sheet material. The trailing side of each punch element 158 is bevelled as indicated at 158a to ensure the formation of a single tab from each layer of sheet material and the positioning of such tabs on the trailing sides of the holes from which they are cut.

As the disc 148 continues to rotate, the element 158 which has most recently cut through the sheet material remains engaged in the holes 176, 178 and drives the sheet material along in a path tangential to the discs 148, 164. By the time that one punch element is withdrawn from the holes it has cut, the following punch element will be sufficiently engaged with the sheet material to continue driving the same. Thus the assembly provides for continuous drive of the sheet material.

After cutting, the depending tabs 180, 182 pass through a recess 184 in the adjacent block portion 142a. The sheet material next passes between a pair of tangentially opposed rollers 186 and 188 rotatably mounted on respective ones of the framework members 140, 142 in following relation to the discs 148 and 164. As the sheet material passes between rollers 186, 188, the tabs 180 and 183 are bent back away from holes 176, 178 upon the main bodies of the layers of sheet material 144, 146. The tabs 180 and 182 thus form self-attaching means for holding the layers 144, 146 together.

For simplicity, the framework members 140 and 142 have been shown as generally rectangular in FIGS. 9 and 10. However, it will be appreciated that, for purposes of positioning one or the other of the sub-assemblies 136, 138 within one of the mandrels 52, it may be necessary to provide a framework member with a partially curved configuration and to position the related disc and bending roller accordingly. Furthermore, the direction of curvature will be determined by the orientation of the sub assembly in the mandrel 52. Such modifications are well within the skill of the art. It is also noted that, while an idler disc 164 has been provided in the preferred embodiment shown, for the purpose of reducing frictional resistance to movement of the sheet material, a stationary backing member having a recess for receipt of punch elements 158 could be employed.

Referring now to FIGS. 14, 15, 16 and 17, there is shown a second form of fastening assembly having two sub-assemblies 190 and 192 adapted to receive overlapped layers of sheet material 200, 202 therebetween. The assembly is primarily intended to be used for fastening the side members 14 to the columns 12 (or 12') or for fastening the material of columns 12' (FIG. 3A) upon itself. When the assembly is used for fastening a side member to a column member, its sub-assemblies are disposed in positions 50 and 98 respectively illustrated in FIG. 7. It would also be possible, with suitable structural modifications, to apply the basic principles of the assembly of FIGS. 14–17 to the joining of the material of the spiral wound columns 12.

Sub-assembly 190 includes a housing 194 having a first solenoid assembly 196 mounted therein. The solenoid assembly 196 includes a rod 198, which is moved toward the sheet material 200, 202 when the solenoid coil 204 is energized. Solenoid assembly 196 further includes a mounting block 206 and a compression spring 208 to return the rod 198 in a direction away from the sheet material when the coil 204 is de-energized in the well known manner.

The end of rod 198 closest to the sheet material 200, 202 is sharpened to form a punch element 210. Thus the solenoid assembly 196 is operative to reciprocate the punch element 210 toward and away from the sheet material. The wall of housing 194 adjacent the sheet material has a slot 212 therein to permit the punch 210 to pass outwardly through the housing and into the sheet material 200, 202 to cut a pair of aligned holes therein. A similar slot 215 is provided in the opposite housing wall distal the sheet material to receive the blunt end of rod 198 when the latter is in its retracted position.

Both slots 212 and 214 are elongated in a direction transverse to the direction of reciprocation of rod 198, and the entire solenoid assembly 196 is mounted for reciprocation in such transverse direction. In particular, mounting block 206 is slidably mounted in housing 194 and is secured to one end of the rod 216 of a second solenoid assembly 218. Solenoid assembly 218 has a mounting block 220 which is fixedly mounted in housing 194.

When the coil 222 of solenoid assembly 218 is energized, the attached solenoid assembly 196 is held in a position distal assembly 218 as illustrated in FIG. 14. When coil 222 is de-energized, the spring 224 of solenoid assembly 218 moves rod 216 and attached solenoid assembly 196 toward solenoid assembly 218, i.e. in a first direction generally parallel to the sheet material and transverse to the direction of reciprocation of rod 198. This brings the solenoid assembly 196 to the position illustrated in FIG. 15. Housing 194 has an aperture 226 for receipt of the rod 216 during such movement. Then when coil 222 is again energized, rod 216 and solenoid assembly 196 are returned to the position of FIG. 14, i.e. moved in a second direction opposite to the first direction mentioned above.

Mounting block 220 has, on the side adjacent the sheet material 200, 202, a flange 228 projecting toward solenoid assembly 196. A die member 230 is mounted on the flange 228 and extends into an opening 232 in the housing 194 whereby it is exposed to the sheet material 200, 202. The mounting block 206 is undercut at 206a to receive flange 228 when solenoid assembly 196 moves toward solenoid assembly 218.

The other sub-assembly 192 includes a framework 234 in which is mounted a third solenoid assembly partially shown at 236. Solenoid assembly 236 is arranged so that, when its coil is not energized, its rod 238 is urged toward sheet material 200, 202 and sub-assembly 190 by a compression spring, and when its coil is energized, rod 238 is drawn away from sub-assembly 190, in the well known manner. A plate 240 is mounted on the end of rod 238 adjacent the sheet material for sliding movement toward and away from the sheet material in the framework 234.

Plate 240 carries first and second die members 242 and 244 respectively. First die member 242 is cylindrical having a planar annular support surface 242a adjacent sheet material 200, 202. Thus, when rod 238 is extended toward the sheet material as shown in FIG. 13, die member 242 supports the sheet material whereby the punch 210 can pass through the sheet material and into the bore of die member 242. Accordingly a pair of aligned holes 245 are formed in the respective layers of sheet material 200, 202 with a plurality of pairs of overlapped tabs 246 of sheet material circumferentially spaced about the periphery of each such pair of holes and depending from the main bodies of the sheet material.

Second die member 244 cooperates with die member 230 (hereinafter referred to as the third die member) to bend the tabs 246 back upon (i.e. in overlying relation to) the main bodies of the sheet material to fasten the layers together. The surface of die member 244 facing sheet material 200, 202 serves as the bending surface for bending back the tabs 246 and includes a central projection 244a whose apex is rounded and whose sides flare outwardly from the apex to the base. The bending surface further includes an annular concavity 244b surrounding the base of projection 244a. Projection 244a is positioned to register with one of the pairs of aligned holes 245 which has been formed by punch 210 and also with a concavity 230a in the opposed surface of third die member 230. When die member 244 is moved toward die member 230 by the spring of solenoid assembly 236, the free edges of tabs 246 are engaged by the projection 244a near its apex, then spread apart by the flared sides of projection 244a, and finally curled or folded back upon the main bodies of the sheet material by the concavity 244b, as shown in the finished fasteners at the right in FIGS. 14 and 15 and also in FIG. 16.

The die member 230 is recessed at 230b over an area including concavity 230a and slightly larger than the holes 245. Thus, as die member 244 is brought into engagement with the sheet material, the main bodies of the sheet material adjacent the aligned holes 245 are deformed into the recess 230b thereby forming a slightly upset rim 247 around each such pair of holes. This increases the strength of the finished fasteners. Thus the surface of die member 230 including concavity 230a and recess 230b serves not only as a support surface for the bending action of die member 244, but also as a bending surface in and of itself.

Figure 17:
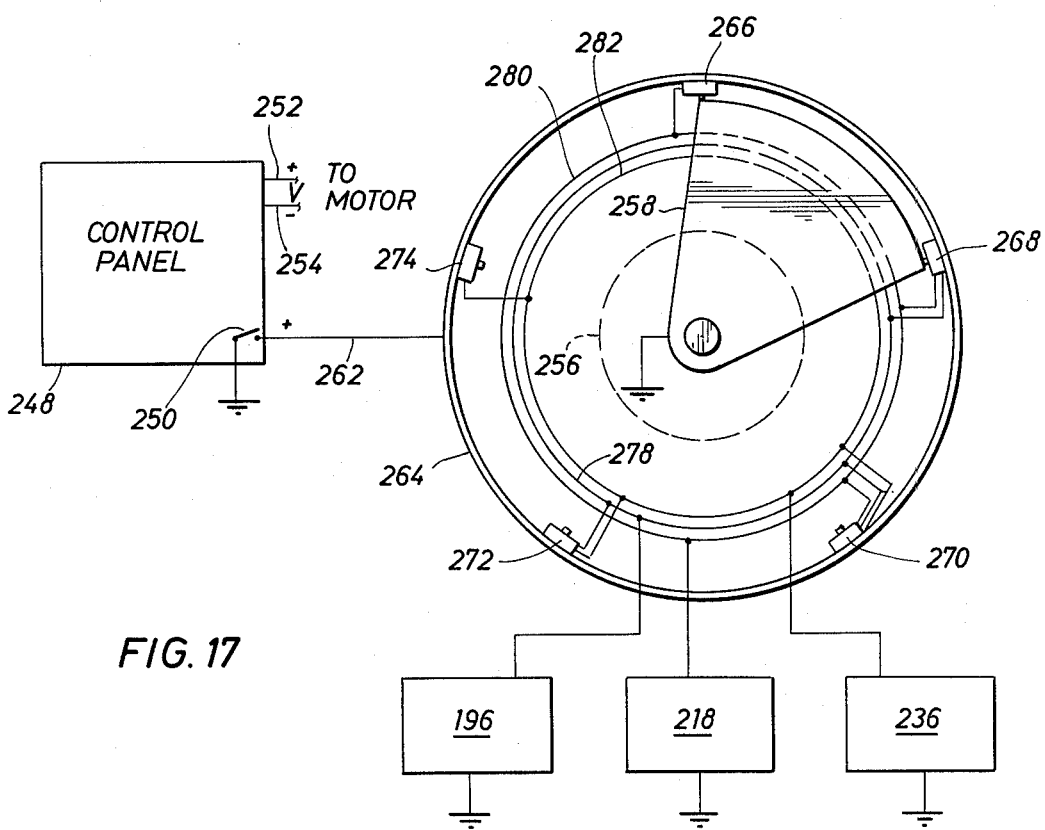
FIG. 17 is a schematic depicting the sequencing means for the assembly of FIGS. 14 and 15.

The sequential operation of the three solenoid assemblies can best be understood by reference to FIG. 17 in conjunction with FIGS. 14 and 15. Such operation is cyclical, each cycle including five steps. FIG. 17 represents only one simplified example of means for effecting such cyclical operation, and it will be apparent that numerous other means, including solid state electronics systems, could be employed.

As indicated in FIG. 17, the sequencing means includes a control panel or station for the entire truss-forming apparatus. By closing a switch 250 on panel 248, a circuit is completed via leads 252 and 254 to a motor which rotates a shaft indicated at 256. Shaft 256 is operatively connected to a rotor 258. Closing a switch 250 also supplies current through line 262 to a conductive ring on which are mounted five switches 266, 268, 270, 272, and 274. Each of the latter switches is electrically connected to one or more of three lines 278, 280, and 282 which are in turn connected to the coils of respective solenoid assemblies 196, 218, and 236. Switches 266-274 are normally open. When mechanically closed by engagement with rotor 258, each switch completes a circuit or circuits to the connected solenoid or solenoids.

When rotor 258 is engaged with switch 266, solenoid assembly 218 is energized whereby solenoid assembly 196 is held in a position distal solenoid assembly 218, i.e. in a position such that punch 210 is aligned with die member 242. Solenoid assembly 196 is de-energized so that punch is retracted from the sheet material 200, 202, and solenoid assembly 236 is also de-energized so that die members 242 and 244 are engaged with the sheet material. Switches 266-276 are symmetrically spaced about rings 264, and rotor 258 is sized so that its leading edge will engage each switch just before or substantially simultaneously with the disengagement of its trailing edge with the preceding switch.

As rotor 258 engages switch 268, solenoid assembly 218 remains energized to hold punch 210 in alignment with die member 242 and solenoid assembly 236 remains de-energized to retain die member 242 in a position supporting the sheet material. Solenoid assembly 196 is energized to effect a stroke of punch 210 through the sheet material and into the bore of die member 242. This position of the assembly is illustrated in FIG. 14.

As rotor 258 engages switch 270, all three of the solenoids are energized. Thus punch 210 is retained in a position in alignment with die member 242 and in engagement with the pair of aligned holes which it has just formed in the two layers of sheet material. However, die member 242 is retracted from the punch and the sheet material to permit subsequent lateral movement of the punch 210 to advance the sheet material. The latter movement is effected where rotor 258 engages switch 272, retaining solenoid assemblies 196 and 236 in energized condition, but permitting de-energizing of solenoid assembly 218 whereby the entire solenoid assembly 196 with punch 210 still engaged in the sheet material is drawn toward solenoid assembly 218. This position of the apparatus is shown in FIG. 15. It will be noted that during this step, the tabs 246 adjacent the holes formed prior to those currently engaged by the punch are brought into alignment with die members 230 and 244.

Closing of switch 274 by rotor 258 permits solenoid assembly 196 to de-energize to retract punch 210 from the sheet material. Upon re-engagement of switch 266 by rotor 258, punch 210 is retained in the retracted position, while solenoid assembly 218 is energized to return solenoid assembly 196 to a position distal solenoid assembly 218 where punch 196 is once again aligned with die member 242. Simultaneously, solenoid assembly 236 is de-energized bringing die member 244 into engagement with the aligned tabs 246 to fold back said tabs and deform the adjacent portion of the main bodies of the sheet material into the recess 230b of die member 230. This also brings die member 244 into a supporting position with respect to the sheet material so that it is ready for the next stroke of the punch 210.

Thus the fastening assembly of FIGS. 14 and 15, as operated by the sequencing means of FIG. 17, is, like the fastening assembly of FIGS. 8 and 10, operative not only to progressively fasten overlapped layers of sheet material together but also to advance the sheet material. It is also noted that the spacing between die members 242 and 244 permits beads 16 of side member 14 to be received therebetween so that the side members may be joined to the column members of the truss without crushing the beads 16.

The various assemblies described above, when incorporated into the complete truss-forming apparatus shown in FIG. 4, may be powdered by any suitable means, such as electric motors, as is well known in the art. Furthermore, the speeds of operation of the various assemblies will be synchronized to permit smooth, continuous operation of the entire apparatus. As mentioned above, the mechanisms for forming the three columns 12 are preferably provided with respective variable speed motors 76 (see FIG. 4). By monitoring deviations of the progressing truss from a straight path, and then selectively varying the speeds of the motors 76, such deviations can be corrected before they advance beyond a negligible degree to produce a virtually straight truss. Electric, electronic or other means may be provided to automatically vary the speeds of the appropriate ones of the fastening assemblies in accord with the speed variations of the motors 76 so that smooth operation will continue at all times.

Referring once again to FIG. 1, there is diagrammatically illustrated one means of monitoring deviations of the truss 10 from a straight path. A transmitter 284 is mounted on or beneath the truss-forming apparatus for transmitting a laser or other beam 286 along the desired centerline of the truss 10. Beam 286 in effect serves as a stationary or reference target. An endpiece 288 is mounted on the free end of truss 10. At the center of endpiece 288 is a target point 288a which is movable with the free end of the truss 10. The relative positions of beam 286 and target point 288a can be monitored by means well known in the art. It is then merely necessary to vary the speeds of the motors 76 so as to maintain beam 286 and point 288a in alignment.

FIG. 1 also indicates that the truss 10 is being deployed from the oribiting vehicle 26 in the direction of the earth E. Thus the slight amount of force which is exerted on the truss 10 by the earth's gravitational field is utilized to further guide the truss 10 in a straight path as it is formed and deployed.

Referring finally to FIGS. 3A and 18-20, there is shown an alternate form of truss and apparatus for forming the columns thereof. As best seen in FIG. 3A, the truss 10' is generally triangular in transverse cross-sectional configuration having three columns 12' interconnected by side members 14. Side members 14 are substantially identical to the like numbered members of the truss 10 of FIGS. 2 and 3. However, columns 12' differ from columns 12 in both general configuration and method of formation.

Each column 12' is generally teardrop shaped in transverse cross-sectional configuration and is oriented with its apex facing laterally outwardly with respect to the truss 10' as a whole. A respective flange portion 12a extends outwardly from the apex of each column for use in connecting the truss 10' to other structural members. The columns 12' are formed by a technique commonly known as "roll forming" in which a strip of sheet material is curved around a mandrel to bring portions adjacent its side edges into juxtaposition. These side portions are then secured together.

To form the columns 12', apparatus such as is illustrated in FIGS. 18-20 may be incorporated into the device shown in FIG. 4 in place of the column-forming assemblies 32. The apparatus of FIGS. 18-20 includes an outer support cylinder 290 which would be mounted on the plate 39 (FIG. 4). Three mandrels 292 are disposed within cylinder 290 parallel thereto and are mounted on cylinder 290 by spacers 294.

A respective reel 296 is mounted below and radially inwardly of each mandrel 292 on brackets 298 extending to plate 30. Each reel 296 contains a rolled strip of sheet material 300 oriented generally tangentially to the respective mandrel 292. The lower portion of each mandrel 292 is enclosed by a housing 302 having open upper and lower ends and mounted on cylinder 290. A roller 304 is mounted on the bottom of each housing at its radially inner side to guide the respective strip of sheet material 300 into the open lower end of housing 302.

Within the housing 302 are a number of rollers, one which is indicated at 304, for beginning to curve the sheet material 300 around the mandrel 292. Above the uppermost one of the spacers 294, a pair of rollers, one of which is shown at 306 are rotatably mounted on cylinder 290 to direct the sheet material 300 further around the mandrel 292. Roller 306 has a cylindrical end portion 306a, as does a similar roller on the other side of mandrel 292, for forming flanges 300a adjacent the side edges of the sheet material 300 (see FIG. 20). These rollers bring the sheet material 300 almost completely around the mandrel 292 but allow a sufficient gap between the flanges 300a, beginning to form therebelow, to permit the sheet material to pass the uppermost spacer 294 (see FIG. 20).

Just upwardly of the roller 306, a fastening assembly, which may be of the type shown in FIGS. 9 and 10 or the type shown in FIGS. 14 and 15, is mounted on the cylinder 290. One of the sub-assemblies of the fastening assembly is shown at 308, and the other sub-assembly is similarly mounted in an opposed position on the other side of flanges 300a of the sheet material. The fastening assembly brings the flanges 300a into abutment and fastens them together to form the flange portion 12a of the resulting column 12'.

Above the fastening assemblies, including sub-assembly 308, there would be a suitable framework mounting rolls of pre-cut sheet material for side members 14 and bead-forming assemblies such as shown in FIGS. 12 and 13. Above the latter assemblies would be the fastening assemblies, shown in FIG. 19 and the upper part of FIG. 18, for fastening the side members 14 to the columns 12'. Each of these fastening assemblies includes one sub-assembly 310, mounted on the interior of a cylinder 312, which is in turn mounted at the upper end of the supporting framework (not shown) for the aforementioned bead-forming assemblies. The other sub-assembly 314 of the pair is disposed within the respective mandrel 292. Each assembly 310, 314 is thus positioned to secure a respective one of the attachment elements 18 of the side members 14 to the adjacent one of the columns 12'.

From the foregoing detailed description it can be seen that the present invention provides a method and automated apparatus for forming structural members which are uniquely suited for use in space. Although the sheet material from which the structural members are formed is extremely light, flexible and thin, the resulting structural members are capable of withstanding tremendous compressive loads and may be used to construct large orbiting structures.

For example, a single column of the teardrop form (FIG. 3A) was constructed from 0.012 in. (0.03 cm.) gauge aluminum. This specimen was 12 in. (30.48 cm.) in length and approximately 1.50 in. (3.81 cm.) wide (measured from side to side rather than from apex to base). The sheet material was fastened upon itself with 7 self-attaching fasteners of the type shown in FIG. 16, spaced approximately 1.50 in. (3.81 cm.) apart. This specimen withstood compressive loads up to 1000 lbs. (4450 nt.).

A complete truss segment of the type shown in FIG. 3A was similarly tested. This specimen included side members of 0.008 in. (0.02 cm.) gauge alumnium and columns of 0.012 in. (0.03 cm.) gauge aluminum. The specimen was 72 in. (182.9 cm.) in length and 24 in. (60.96 cm.) wide on each side. This specimen withstood compressive loads up to 1580 lb. (7031 nt.).

Thus the present invention provides a practical expedient for the construction of large space structures, such as orbiting solar collectors. By using a basic sheet material which is lightweight and readily compacted, it is possible to carry enough material to construct a large number of long structural units in a single trip of the transport vehicle. The use of the self-attaching fasteners also reduces bulk and weight by eliminating the need to transport separate fastening means. Furthermore, the formation of such fastening means produces no chips or other debris or wasteful by-products. The precutting of the material for the side members further reduces the weight of the material while also enhancing the uniformity of thermal expansion of the finished unit. Furthermore, the apparatus may be fully automated thereby requiring minimal extra-vehicular activity by the operating personnel. Numerous other advantages inherent in the invention as described above will be evident.

It can further be appreciated that various modifications of the embodiments described above may be made without departing from the spirit of the invention. By way of example only, where a suitable plastic sheet material is used in place of aluminum, it might be secured upon itself by a heat fusion technique, rather than by the use of the tab-type fasteners disclosed above. It is also noted that terms such as "upwardly," "downwardly," "above," etc. have been used herein merely for convenience and with reference to the positions in which the apparatus appears in the drawings and are not intended in a limiting sense with regard to any actual positions in use. It is therefore intended that the scope of the invention be limited only by the claims which follow.

I claim:

1. A method of manufacturing in situ a structural member from compactly stored flexible single sheet material comprising:
   (a) progressively forming a plurality of generally tubular column members, each by advancing sheet material from an independent source into a column forming assembly, and deploying the column members generally parallel to one another;
   (b) interconnecting adjacent column members simultaneously with the forming thereof by progressively securing a respective side member between each such pair of adjacent column members each side member being comprised of a strip of the sheet material advanced from an independent source.

2. The method of claim 1 wherein each of said side members includes a pair of opposite side edges and is oriented with each such side edge disposed adjacent a respective one of the column members interconnected by said side member.

3. The method of claim 2 wherein the securing of said side members to said column members includes forming selfattaching fasteners of the sheet material of said column members and side members.

4. The method of claim 3 wherein the sheet material of the side member adjacent each of said side edges is positioned adjacent the respective column member to form overlapping layers of the sheet material of said side member and said column member, said securing including punching through said overlapping layers to form overlapping tabs of said sheet material depending from the main bodies of said sheet material, and bending said tabs back upon the main bodies of said sheet material.

5. The method of claim 2 wherein the sheet material of each of said side members is compacted in the form of a roll prior to formation of said structural member and deployed from such roll during formation of the structural member.

6. The method of claim 5 wherein the sheet material of each of said side members is pre-cut to form, a pair of attachment elements extending longitudinally along said side edges for securing to said column members, a plurality of strut elements extending transversely between said attachment elements, and a plurality of open spaces between said attachment elements and strut elements.

7. The method of claim 6 wherein at least some of said strut elements are formed generally perpendicular to said attachment elements to serve as compression struts.

8. The method of claim 7 including sequentially forming elongate beads on each of said side members, each of said beads being formed to extend between the side edges of said side member along a respective one of said compression struts and being formed prior to securing the adjacent portions of said attachment elements to said column members.

9. The method of claim 7 wherein others of said strut elements are formed diagonally with respect to said attachment elements and compression struts to serve as tension struts.

10. The method of claim 1 wherein each of said column members is formed from a respective strip of said sheet material closed upon itself.

11. The method of claim 10 wherein three of said column members are formed.

12. The method of claim 10 wherein the sheet material of each of said column members is compacted in the form of a roll prior to formation of said column member and is deployed from such roll during formation of the column member.

13. The method of claim 10 including fastening the sheet material of each of said column members upon itself to form said column member by forming self-attaching fasteners of the sheet material of said column member.

14. The method of claim 13 wherein said fastening includes disposing portions of the sheet material of each of said column members in overlapping layers, punching through said overlapping layers to form overlapping tabs of said sheet material depending from the main body of said sheet material, and bending said tabs back upon the main body of said sheet material.

15. The method of claim 10 wherein each of said columns is formed by helically winding the respective strip of sheet material.

16. The method of claim 10 wherein the strip of sheet material of each of said column members includes a pair of opposite side edges, and wherein each of said columns is formed by rolling said strip of sheet material to bring said side edges into juxtaposition.

17. The method of claim 1 being performed in space.

18. The method of claim 17 including providing a reference target and forming and deploying said structural member in the direction of said target.

19. The method of claim 18 including selectively varying the speeds of formation of said column members to maintain said structural member in alignment with said target.

20. The method of claim 19 including sensing a movable target mounted on and movable with said structural member and varying said speeds to maintain said targets in alignment.

21. The method of claim 17 including forming and deploying said structural member toward the earth.

22. The method of claim 1 using aluminum as said sheet material.

23. Apparatus for manufacturing in situ a structural member from compactly stored flexible single sheet material comprising:
   a plurality of storage means adapted to receive the flexible single sheet material in compacted form;
   column-forming means for progressively forming a plurality of tubular column members each by advancing sheet material from one of said plurality of storage means and deploying said column members generally parallel to one another;

means for progressively positioning a respective side member between adjacent column members simultaneously with the forming thereof, each side member being comprised of a strip of the sheet material advanced from one of said plurality of storage means;

and connecting means for progressively securing each side member to the adjacent column members.

24. The apparatus of claim 23 wherein said storage means comprise storage reels for receiving said sheet material in roll form.

25. The apparatus of claim 24 including a separate one of said storage reels for each of said column members and side members.

26. The apparatus of claim 23 wherein said column-forming means includes a respective column-forming assembly for each of said column members, each of said column-forming assemblies comprising means for closing a respective strip of said sheet material upon itself to form the respective column member.

27. The apparatus of claim 26 wherein each of said column-forming assemblies is operative to helically wind the respective strip of said sheet material.

28. The apparatus of claim 27 wherein said storage means comprise a separate storage member for the strip of sheet material of each of said column members, and wherein each of said column-forming assemblies comprises a stationary mandrel, guide means for directing the respective strip of sheet material from the respective one of said storage members onto said mandrel, and means mounting said storage member and said guide means for rotation about said mandrel to helically wrap said strip of sheet material on said mandrel.

29. The apparatus of claim 26 wherein the strip of said sheet material of each of said column members includes a pair of opposite side edges, and wherein each of said column-forming assemblies is operative to roll said strip of said sheet material to bring said side edges into juxtaposition.

30. The apparatus of claim 26 wherein each of said column-forming assemblies includes a fastening assembly for fastening the sheet material of the respective column member upon itself by forming self-attaching fasteners of the sheet material of said column member.

31. The apparatus of claim 30 wherein each of said column-forming assemblies is operative to dispose portions of the respective strip of sheet material in overlapping layers, and wherein said fastening assembly includes punch means for punching through said overlapping layers to form overlapping tabs of said sheet material depending from the the main body of said sheet material, and bending means for bending said tabs back upon the main body of said sheet material.

32. The apparatus of claim 31 wherein said punch means is carried by a rotary carrier disposed generally tangentially to said overlapping layers of said sheet material.

33. The apparatus of claim 31 wherein said punch means is mounted for reciprocation generally into and out of said overlapping layers of said sheet material.

34. The apparatus of claim 33 wherein said punch means is further mounted for movement in a path generally transverse to the direction of said reciprocation while engaged in said overlapping layers to advance said sheet material.

35. The apparatus of claim 26 wherein each of said column-forming assemblies includes a column drive assembly, the speeds of said column drive assemblies being individually selectively variable to vary the speeds of formation of said column members.

36. The apparatus of claim 23 wherein each of said side members includes a pair of opposite side edges, and wherein said positioning means is operative to orient each of said side members with each of its side edges adjacent a respective one of the column members to be interconnected by said side member.

37. The apparatus of claim 36 wherein said connecting means comprises a plurality of fastening assemblies, each for securing a respective side of a respective one of said side members to the adjacent one of said column members by forming self-attaching fasteners of the sheet material of said column member and said side member.

38. The apparatus of claim 37 wherein said positioning means is operative to position the sheet material adjacent each of said side edges adjacent the respective column member to form overlapping layers of the sheet material of said side member and said column member, and wherein said fastening assembly includes punch means for punching through said overlapping layers to form overlapping tabs of said sheet material depending from the main bodies of said sheet material, and bending means for bending said tabs back upon the main bodies of said sheet material.

39. The apparatus of claim 38 wherein said punch means is carried by a rotary carrier disposed generally tangentially to said overlapping layers of said sheet material.

40. The apparatus of claim 38 wherein said punch means is mounted for reciprocation generally into and out of said overlapping layers of said sheet material.

41. The apparatus of claim 40 wherein said punch means is further mounted for movement in a path generally transverse to the direction of said reciprocation while engaged in said overlapping layers to advance said sheet material.

42. The apparatus of claim 31 further comprising bead-forming means operative to sequentially form a series of elongate beads on each of said side members, each of said beads being formed to extend between the side edges of the respective side member and prior to securing of the adjacent portions of said side member to said column members by said connecting means.

43. The apparatus of claim 42 wherein said bead-forming means includes a plurality of bead-forming assemblies each associated with a respective one of said side members, each of said bead-forming assemblies including opposed first and second die members having said side member interposed therebetween, first drive means for simultaneously reciprocating said die members toward and away from said side member, and second drive means for advancing said die members in a first direction generally parallel to said side member when said die members are engaged with said side member and for retracting said die members in a second direction generally opposite said first direction when said die members are disengaged from said side member.

44. The apparatus of claim 42 wherein said die members have mating arcuate cross-sectional configurations for forming arcuate beads.

45. A structural member comprising:
a plurality of tubular, generally parallel column members formed of flexible sheet material, a plurality of respective side members, each comprised of a strip of sheet material interconnecting adjacent pairs of the column members, each of said side members including a pair of longitudinally extending attachment elements secured to respective ones of the connected pair of column members, and strut elements extending transversely between said attachment elements, with open spaces between said attachment elements and strut elements, and wherein at least some of said strut elements are disposed generally perpendicular to said attachment elements to serve as compression struts, and wherein each of said compression struts has an elongate bead extending therealong and through the adjacent portions of said attachment elements, and first self-attaching means connecting each side member to the adjacent column members and formed by the members connected.

46. A structural member according to claim 45 wherein said beads are of arcuate cross-section configuration.

47. A structural member according to claim 45 wherein others of said strut elements are disposed diagonally with respect to said attachment elements and compression struts to serve as tension struts.

48. A structural member according to claim 48 wherein the sheet material of each of said side members overlaps the sheet material of the connected column members, and wherein said first self-attaching means include overlapping tabs of said sheet material cut from the main bodies of said overlapping sheet material and folded back upon the main bodies.

49. A structural member according to claim 51 wherein each of said first self-attaching means includes a plurality of pairs of said overlapping tabs radiating from a common pair of aligned apertures in the main bodies of said overlapping sheet material.

50. A structural member according to claim 48 wherein each of said column members is comprised of a respective strip of sheet material closed upon itself.

51. A structural member according to claim 50 wherein the sheet material of each of said column members is fastened upon itself by second self-attaching means formed by said column member.

52. A structural member according to claim 51 wherein the sheet material of each of said column members forms overlapping layers, and wherein said second self-attaching means include overlapping tabs of said sheet material cut from the main body of said overlapping sheet material and folded back upon said main body.

53. A structural member according to claim 52 wherein each of said second self-attaching means includes a plurality of pairs of said overlapping tabs radiating from a common pair of aligned apertures in said overlapping sheet material.

54. A structural member according to claim 50 wherein the sheet material of each of said column members is helically wound.

55. A structural member according to claim 50 wherein the strip of sheet material of each of said column members includes a pair of opposite side edges, said strip of sheet material being rolled so that said side edges are juxtaposed.

56. A structural member according to claim 55 wherein each of said column members is generally teardrop-shaped in transverse cross section.

57. A structural member according to claim 56 wherein said column members are oriented such that the apexes of said teardrop shapes face laterally outwardly, and wherein each of said side members is disposed generally tangentially to the connected column members.

58. A structural member according to claim 57 wherein the strip of sheet material of each of said column members has flange portions adjacent to and including said side edges and extending laterally outwardly from the apex of said teardrop shape.

59. A structural member according to claim 48 wherein said sheet material is aluminum.

60. A structural number according to claim 45 wherein there are three of said column members.

* * * * *